(12) United States Patent
Sugihara et al.

(10) Patent No.: US 8,645,806 B2
(45) Date of Patent: Feb. 4, 2014

(54) OPTICAL RECEIVING APPARATUS AND OPTICAL RECEIVING METHOD

(75) Inventors: Takashi Sugihara, Tokyo (JP); Takashi Mizuochi, Tokyo (JP); Kazuo Kubo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 269 days.

(21) Appl. No.: 12/775,825

(22) Filed: May 7, 2010

(65) Prior Publication Data

US 2010/0287450 A1 Nov. 11, 2010

(30) Foreign Application Priority Data

May 8, 2009 (JP) ................................. 2009-113626

(51) Int. Cl.
*H03M 13/45* (2006.01)

(52) U.S. Cl.
USPC ......................................................... 714/780

(58) Field of Classification Search
USPC ......................................................... 714/780
See application file for complete search history.

(56) References Cited

U.S. PATENT DOCUMENTS

| | | | |
|---|---|---|---|
| 5,319,649 A | 6/1994 | Raghavan et al. | |
| 6,061,823 A * | 5/2000 | Nara | 714/758 |
| 7,027,533 B2 * | 4/2006 | Abe et al. | 375/341 |
| 7,239,673 B2 * | 7/2007 | Sawada et al. | 375/316 |
| 7,392,440 B2 | 6/2008 | Ouchi et al. | |
| 7,716,561 B2 * | 5/2010 | Belogolovyi et al. | 714/780 |
| 8,015,468 B2 * | 9/2011 | Krouk et al. | 714/752 |
| 8,064,543 B2 * | 11/2011 | Kim et al. | 375/326 |
| 8,074,157 B2 * | 12/2011 | Haratsch | 714/795 |
| 2007/0011586 A1 | 1/2007 | Belogolovyi et al. | |
| 2009/0022249 A1 | 1/2009 | Aizawa | |

FOREIGN PATENT DOCUMENTS

| | | |
|---|---|---|
| CN | 101404564 A | 4/2009 |
| JP | 2003-258758 | 9/2003 |
| JP | 2003-258762 | 9/2003 |
| JP | 2004-349888 | 12/2004 |
| JP | 2005-33547 | 2/2005 |
| JP | 2009-27470 | 2/2009 |

OTHER PUBLICATIONS

Takashi Mizuochi et al., "Next Generation FEC for Optical Communication", OFC/NFOEC2008, Tutorial, OTuE5, 2008, pp. 1-33.

(Continued)

*Primary Examiner* — James C Kerveros
(74) *Attorney, Agent, or Firm* — Oblon, Spivak, McClelland, Maier & Neustadt, L.L.P.

(57) ABSTRACT

An optical receiving apparatus includes: an A/D converting circuit; a received-signal demodulating circuit that demodulates a received digital signal from the A/D converting circuit into an m-bit received signal; a soft-decision-data generating circuit that generates n-bit (n≤m) soft-decision data based on the m-bit received signal; and an error correcting circuit that performs error correction based on the n-bit soft-decision data and outputs an error-corrected received signal. The soft-decision-data generating circuit generates soft-decision data of n bits (n=p+1) that corresponds to a determination result according to $2^n-1$ soft-decision thresholds, by using an MSB of the m-bit received signal as hard-decision data, and by using, as reliability information, a result of comparison between a plurality of bits (k bits, where k≤m) on an MSB side of the m-bit received signal and a fixed threshold, or p bits (p≤m−k) selected from (m−k) bits on an LSB side of the m-bit received signal.

7 Claims, 4 Drawing Sheets

(56) References Cited

OTHER PUBLICATIONS

Yoshikuni Miyata et al., "Proposal for Frame Structure of Optical Channel Transport Unit Employing LDPC Codes for 100 Gb/s FEC", OSA/OFC/NFOEC2009, NThB2, 2009, 3 pages.

Kiyoshi Onohara et al., "Automatic Tracking of 3-bit Soft Decision Thresholds in Block Turbo Code based Forward Error Correction", ECOC2006, we1.5.6, 2 pages.

Combined Chinese Office Action and Search Report issued Oct. 10, 2012 in Patent Application No. 201010173424.X with English Translation.

Office Action issued on Mar. 21, 2013 in the corresponding Chinese Patent Application No. 201010173424.X (with English Translation).

Extended Search Report issued Jul. 8, 2013, in European Patent Application No. 10 004 533.5.

Office Action issued Sep. 26, 2013, in Chinese Patent Application No. 201010173424.X (with English-language Translation).

\* cited by examiner

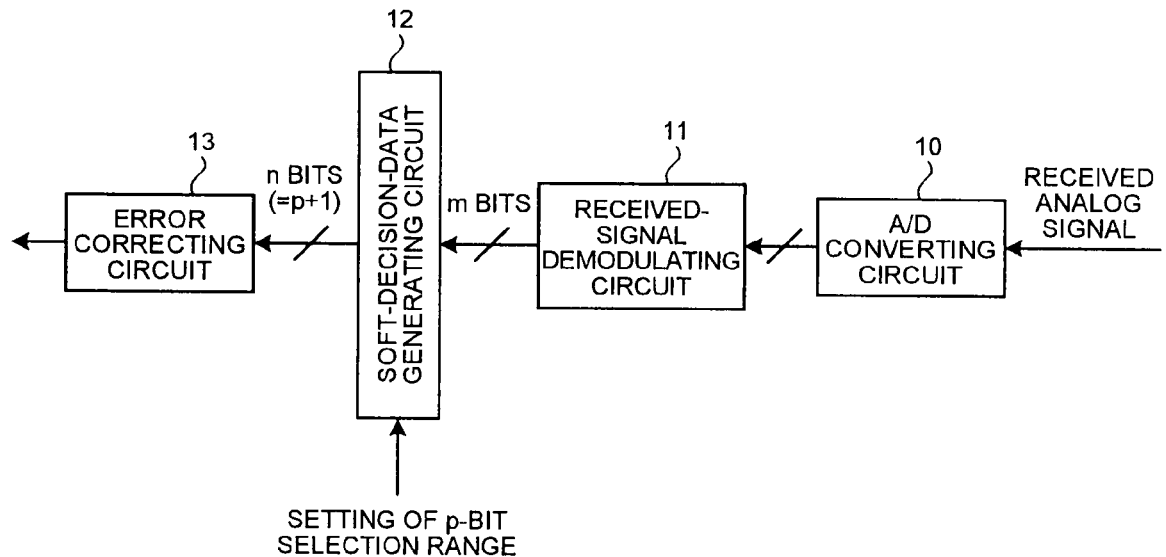

FIG.3

| | INPUT TO SOFT-DECISION-DATA GENERATING CIRCUIT (6 BITS) | OUTPUT 1 FROM SOFT-DECISION-DATA GENERATING CIRCUIT (3 BITS) | | OUTPUT 2 FROM SOFT-DECISION-DATA GENERATING CIRCUIT (3 BITS) |
|---|---|---|---|---|
| #1 | 100100 TO 111111 | '1'+'11' | → | 111 |
| #2 | 100011 | '1'+'11' | | 111 |
| #3 | 100010 | '1'+'10' | | 110 |
| #4 | 100001 | '1'+'01' | | 101 |
| #5 | 100000 | '1'+'00' | | 100 |
| #6 | 011111 | '0'+'11' | INVERT RELIABILITY-INFORMATION BITS → | 000 |
| #7 | 011110 | '0'+'10' | | 001 |
| #8 | 011101 | '0'+'01' | | 010 |
| #9 | 011100 | '0'+'00' | | 011 |
| #10 | 000000 TO 011011 | '0'+'00' | | 011 |

FIG.4

INPUT DATA RANGE     RELIABILITY INFORMATION

101000 TO 111111     [b5:b3]≧'101'→'11'

100110 TO 100111     [b2:b1]→'11'

D6 - - - - - - - - - - - - - - - - - - - - - - - - - - -

100100 TO 100101     [b2:b1]→'10'    ↕2 LSB

D5 - - - - - - - - - - - - - - - - - - - - - - - - - - -

100010 TO 100011     [b2:b1]→'01'    ↕2 LSB

D4 - - - - - - - - - - - - - - - - - - - - - - - - - - -

100000 TO 100001     [b2:b1]→'00'    ↕2 LSB

D3 - - - - - - - - - - - - - - - - - - - - - - - - - - -

011110 TO 011111     [b2:b1]→'11'    ↕2 LSB

D2 - - - - - - - - - - - - - - - - - - - - - - - - - - -

011100 TO 011101     [b2:b1]→'10'    ↕2 LSB

D1 - - - - - - - - - - - - - - - - - - - - - - - - - - -

011010 TO 011011     [b2:b1]→'01'    ↕2 LSB

D0 - - - - - - - - - - - - - - - - - - - - - - - - - - -

011000 TO 011001     [b2:b1]→'00'

000000 TO 010111     [b5:b3]≦'010'→'00'

(SOFT-DECISION THRESHOLD)

FIG.5

| | INPUT TO SOFT-DECISION-DATA GENERATING CIRCUIT (6 BITS) | OUTPUT 1 FROM SOFT-DECISION-DATA GENERATING CIRCUIT (3 BITS) | | OUTPUT 2 FROM SOFT-DECISION-DATA GENERATING CIRCUIT (3 BITS) |
|---|---|---|---|---|
| #1 | 101000 TO 111111 | '1'+'11' | → | 111 |
| #2 | 100110 TO 100111 | '1'+'11' | | 111 |
| #3 | 100100 TO 100101 | '1'+'10' | | 110 |
| #4 | 100010 TO 100011 | '1'+'01' | | 101 |
| #5 | 100000 TO 100001 | '1'+'00' | | 100 |
| #6 | 011110 TO 011111 | '0'+'11' | INVERT RELIABILITY-INFORMATION BITS → | 000 |
| #7 | 011100 TO 011101 | '0'+'10' | | 001 |
| #8 | 011010 TO 011011 | '0'+'01' | | 010 |
| #9 | 011000 TO 011001 | '0'+'00' | | 011 |
| #10 | 000000 TO 010111 | '0'+'00' | | 011 |

FIG.6

| | INPUT DATA RANGE | RELIABILITY INFORMATION | |
|---|---|---|---|
| | 110000 TO 111111 | $[b5:b4] \geq$ '11'→'11' | |
| D6 | 101100 TO 101111 | $[b3:b2]$→'11' | 4 LSB |
| D5 | 101000 TO 101011 | $[b3:b2]$→'10' | 4 LSB |
| D4 | 100100 TO 100111 | $[b3:b2]$→'01' | 4 LSB |
| D3 | 100000 TO 100011 | $[b3:b2]$→'00' | 4 LSB |
| D2 | 011100 TO 011111 | $[b3:b2]$→'11' | 4 LSB |
| D1 | 011000 TO 011011 | $[b3:b2]$→'10' | 4 LSB |
| D0 | 010100 TO 010111 | $[b3:b2]$→'01' | 4 LSB |
| | 010000 TO 010011 | $[b3:b2]$→'00' | |
| | 000000 TO 001111 | $[b5:b4] \leq$ '00'→'00' | |

SOFT-DECISION THRESHOLD

| | INPUT TO SOFT-DECISION-DATA GENERATING CIRCUIT (6 BITS) | OUTPUT 1 FROM SOFT-DECISION-DATA GENERATING CIRCUIT (3 BITS) | | OUTPUT 2 FROM SOFT-DECISION-DATA GENERATING CIRCUIT (3 BITS) |
|---|---|---|---|---|
| #1 | 110000 TO 111111 | '1'+'11' | | 111 |
| #2 | 101100 TO 101111 | '1'+'11' | | 111 |
| #3 | 101000 TO 101011 | '1'+'10' | → | 110 |
| #4 | 100100 TO 100111 | '1'+'01' | | 101 |
| #5 | 100000 TO 100011 | '1'+'00' | | 100 |
| #6 | 011100 TO 011111 | '0'+'11' | | 000 |
| #7 | 011000 TO 011011 | '0'+'10' | INVERT RELIABILITY-INFORMATION BITS → | 001 |
| #8 | 010100 TO 010111 | '0'+'01' | | 010 |
| #9 | 010000 TO 010011 | '0'+'00' | | 011 |
| #10 | 000000 TO 001111 | '0'+'00' | | 011 |

OPTICAL RECEIVING APPARATUS AND OPTICAL RECEIVING METHOD

BACKGROUND OF THE INVENTION

1. Field of the Invention

The present invention relates to an optical receiving apparatus having a simplified circuit that generates soft-decision data for use in error correction.

2. Description of the Related Art

To achieve increase in a transmission distance and a capacity of a wavelength division multiplexing (WDM) optical communication system, it is important to secure a signal quality against degradation of optical signal-to-noise ratio (SNR). When an optical communication system of 10 gigabits per second (Gbps) in each wavelength is enhanced to have a rate of 100 Gbps, an improvement in an optical SNR resistance of about 10 dB is required to obtain the same signal quality.

As a method to improve an optical SNR resistance, error correction techniques are employed (For example, "Next generation FEC for optical communication" by T. Mizuochi et al., OFC/NFOEC 2008, OTuE4, 2008). For the purpose of obtaining a high correction capability applicable to optical communication systems having a rate on the order of 100 Gbps, error correction techniques that are based on soft decision have been studied (for example, Japanese Patent Application Laid-open No. 2005-33547, "Next generation FEC for optical communication", and "Proposal for frame structure of optical channel transport unit employing LDPC codes for 100 Gb/s FEC" by Y. Miyata et al., OFC/NFOEC 2009, NThB2, 2009).

In a digital-coherent optical receiving apparatus as disclosed in the above literature by Y. Miyata et al., a bit resolution of an analog-to-digital (A/D) converting circuit that converts an analog value of a received optical signal to a digital value, or a data bit width in a digital-signal processing circuit such as a received-signal demodulating circuit, which is connected at a later stage of the A/D converting circuit, is typically sufficiently larger than a bit width of soft-decision data necessary for error correction. In order to realize a soft-decision error-correcting circuit having a throughput of around 100 Gbps, realization of reduction with a bit width of soft-decision data in a simpler configuration is important in terms of reduction in a circuit size.

In a practical optical communication system, distribution of noise contained in a received optical signal can be symmetrical or asymmetrical depending on modulation methods applied. Therefore, it is important for practical use of a system to easily obtain optimal soft-decision data regardless of how noise contained in a received optical signal is distributed.

Soft-decision information can be generated by directly implementing in a digital circuit a comparison with multiple soft-decision thresholds as disclosed in Japanese Patent Application Laid-open No. 2005-33547, for example. However, reduction of the comparison operation is important for decreasing the circuit size.

A bit-width reduction technique based on reliability information is disclosed in Japanese Patent Application Laid-open No. 2009-27470 as a soft-decision-data generating circuit that reduces a bit width. When considering signal processing at a rate of around 100 Gbps, however, it is desirable to have a method that can more easily extract reliability information to generate soft-decision data.

Other techniques have also been disclosed: a technique that selects only bit data on a most significant bit (MSB) side in soft-decision data and discards the remaining bit data on a least significant bit (LSB) side (for example, Japanese Patent Application Laid-open No. 2003-258758), a technique that shifts a position where bit data is selected according to conditions of a transmission channel (for example, Japanese Patent Application Laid-open No. 2003-258762), and a technique that selects a soft-decision threshold based on hard-decision data for an immediately preceding bit (for example, Japanese Patent Application Laid-open No. 2004-349888). However, none of these techniques disclose a specific method of easily generating, corresponding to noise distribution of a received optical signal, soft-decision data with a reduced bit width from a digital signal output by a decoding circuit.

The conventional techniques have following problems.

With respect to the conventional soft-decision-data generating circuit that is based on data comparison with multiple soft-decision thresholds, the comparison operation for generating soft-decision data increases when the bit width of data being handled increases.

The conventional soft-decision-data generating circuit that reduces a bit width according to reliability information requires an operation for generating soft-decision data. Therefore, high processing load is required and the circuit size is increased.

Furthermore, there is a problem in that soft-decision data cannot be easily generated with a reduced bit width from a digital signal output by a decoding circuit as appropriate according to noise distribution of a received optical signal.

SUMMARY OF THE INVENTION

It is an object of the present invention to at least partially solve the problems in the conventional technology.

An optical receiving apparatus according an aspect of the present invention comprises an analog-to-digital (A/D) converting circuit that converts a received analog signal to a received digital signal; a received-signal demodulating circuit that demodulates the received digital signal into an m-bit received signal; a soft-decision-data generating circuit that generates n-bit (n≤m) soft-decision data based on the m-bit received signal; and an error correcting circuit that performs error correction based on the n-bit soft-decision data and outputs an error-corrected received signal, wherein the soft-decision-data generating circuit generates soft-decision data of n bits (n=p+1) that corresponds to a determination result according to $2^n-1$ soft-decision thresholds, by using a most significant bit (MSB) of the m-bit received signal as hard-decision data, and by using, as reliability information, a result of comparison between a plurality of bits (k bits, where k≤m) on a MSB side of the m-bit received signal and a fixed threshold, or p bits (p≤m−k) selected from (m−k) bits on a least significant bit (LSB) side of the m-bit received signal.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a configuration diagram showing an optical receiving apparatus according to an embodiment of the present invention; and FIGS. 2 to 8 are schematic diagrams explaining the optical receiving apparatus according to the embodiment.

DETAILED DESCRIPTION OF THE PREFERRED EMBODIMENTS

Figures 7, 8:
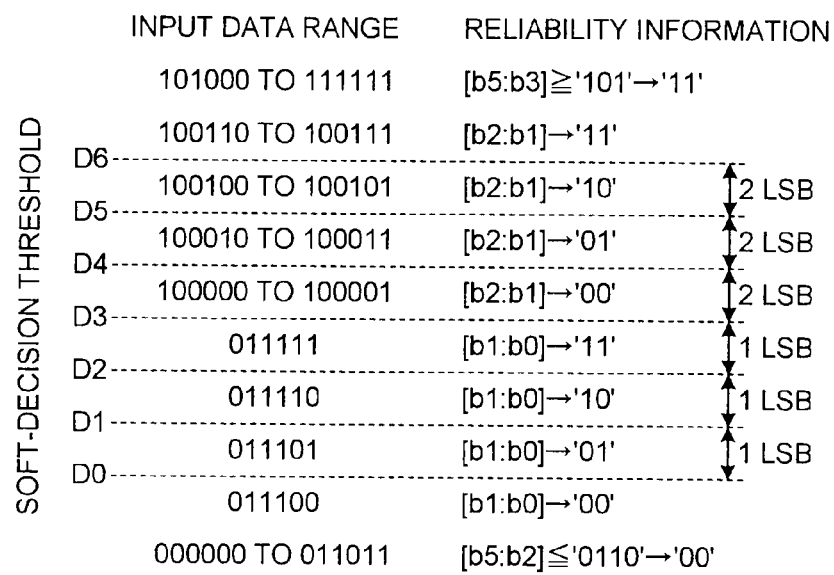

Exemplary embodiments of the present invention will be explained with reference to the accompanying drawings. In the drawings, like or corresponding parts are denoted by like reference numerals. The present invention is not limited to the embodiments.

FIG. 1 is a block diagram showing an optical receiving apparatus according to an embodiment of the present invention.

As shown in FIG. 1, the optical receiving apparatus includes an A/D converting circuit 10, a received-signal demodulating circuit 11, a soft-decision-data generating circuit 12, and an error correcting circuit 13.

Functions of the components of the optical receiving apparatus are described below.

The A/D converting circuit 10 converts a received analog signal, which is generated through optical/electrical conversion at a receiving end of an optical communication system, to a digital signal.

The received-signal demodulating circuit 11 demodulates the received digital signal output from the A/D converting circuit 10 into a received signal, and outputs the signal having a data width of m bits. For example, when coherent detection is performed to demodulate a quadrature phase shift keying (QPSK) signal into a received signal, this functional block performs various kinds of digital signal processing that are employed in a typical digital-coherent reception technique, such as waveform equalization, frequency synchronization, frequency offset correction, phase estimation, and symbol timing extraction.

The soft-decision-data generating circuit 12 generates and outputs soft-decision data of n bits (n≤m) to the error correcting circuit 13, using the output signal (m bits) from the received-signal demodulating circuit 11 as input. Data generation process in the soft-decision-data generating circuit 12 will be described later.

The error correcting circuit 13 performs soft-decision error correction based on the soft-decision data supplied from the soft-decision-data generating circuit 12, and outputs an error-corrected received signal. The error correcting circuit 13 performs processes that are required for typical soft-decision error correction, such as deinterleaving, soft-decision decoding, and error-corrected frame synchronization. Then, the error correcting circuit 13 outputs error-corrected hard-decision data.

Soft-decision data generation process in the soft-decision-data generating circuit 12 is described below by exemplifying a case that the circuit 12 outputs soft-decision data containing 1 bit of hard-decision data and 2 bits (p=2) of reliability information, that is, 3 bits in total (n=p+1=3), based on 6-bit (m=6) input data.

FIG. 2 depicts a data processing method in a case that seven (i.e., $2^3-1$) soft-decision thresholds (D0 to D6) are set at an interval of 1 LSB based on the 6-bit data supplied from the received-signal demodulating circuit 11. For each of the soft-decision thresholds, corresponding reliability information (2 bits) is generated.

It is assumed that the 6-bit data ([b5:b0] where MSB is b5 and LSB is b0) represents a signal, a value of which is [−1 to +1] on an I (In-Phase) or Q (Quadrature-Phase) channel in QPSK modulation, in [000000 to 111111].

For hard-decision data, one bit of the MSB (b5) is adopted. Because a received optical signal of QPSK can be regarded to contain symmetrical Gaussian noise, a result of 0/1 decision using a central value of 6 bits as the threshold value can be adopted as hard-decision data. Thus, the MSB can be adopted.

Reliability information is determined in the following procedure.

A reliability rule disclosed in "Next generation FEC for optical communication" is adopted in this explanation. Specifically, reliability information is set as 11, 10, 01, and 00 in a descending order of certainty (that is, "11" represents highest reliability and "00" represents lowest reliability). For example, "1" that is most reliable is represented as "111" and "0" that is most reliable is represented as "011". Likewise, least reliable "1" is represented as "100" and least reliable "0" is represented as "000".

As is understood from "Next generation FEC for optical communication", the hard-decision data is more reliable when soft-decision data, in which the hard-decision data is contained, is positioned farther from a hard-decision threshold (D3) positioned at the center of the seven soft-decision thresholds, compared to when the soft-decision data is positioned closer to the hard-decision threshold. To generate reliability information corresponding to the soft-decision thresholds set at the interval of 1 LSB according to the rule mentioned above, a pair of b1 and b0 shown in FIG. 2 should be extracted as reliability.

For a pair with a result of hard decision being "0", reliability information conforming to the rule can be obtained by inverting the extracted data.

For data lying outside of the outermost soft-decision thresholds D0 and D6, higher-order four bits [b5:b2] can be compared to a fixed value to determine reliability.

FIG. 3 depicts combinations of input data (6 bits) and output data (3 bits) of the soft-decision-data generating circuit 12 based on the reliability information derived in the procedure shown in FIG. 2. When hard-decision data is "0", whether to invert the reliability can be properly determined based on compatibility with the error correcting circuit 13, which is connected at a later stage of the circuit 12.

FIGS. 4 and 5 depict soft-decision data generation performed when the seven soft-decision thresholds are arranged at an interval of 2 LSBs. FIGS. 6 and 7 depict soft-decision data generation performed when the thresholds are arranged at an interval of 4 LSBs. It can be seen that in the both cases, soft-decision data can be easily generated just by comparing MSB-side bits with a fixed value and extracting 2 bits from LSB-side bits.

As described above, soft-decision data of n (=p+1) bits can be simply generated by using the MSB bit as hard-decision data and determining reliability information by comparison of MSB-side higher-order bits (k bits, where k≤m) with a fixed value or selection of bits (p bits (p≤m−k)) from LSB-side bits ((m−k) bits). Therefore, the circuit size can be reduced as compared to when soft-decision data is generated by the comparison operation with each soft-decision threshold on the entire signal of a 6-bit data width.

A configuration may of course be adopted that allows a bit pair for selection as reliability information to be set from outside so that the error correction capability is optimized.

FIGS. 2 to 7 depict setting of equally-spaced soft-decision thresholds. However, there is a case that distribution of noise contained in a received optical signal is asymmetrical at a receiving end of an optical communication system in on-off keying (OOK) modulation. In such a case, it is known that the error correction capability is optimized by setting a wider interval for soft-decision thresholds on a mark side (that is, hard-decision data is "1") than that on a space side (that is, hard-decision data is "0") of a received optical signal as disclosed in Japanese Patent Application Laid-open No. 2005-33547.

FIG. 8 depicts a method for generating reliability information when soft-decision thresholds are set at an interval of 2 LSBs on a mark side while soft-decision thresholds are set at an interval of 1 LSB on a space side to handle asymmetrical noise distribution. By differently setting bit positions to be extracted as reliability information and also, a fixed value and a bit width used in comparison for determining reliability of outside of the soft-decision thresholds D0 and D6 depending on hard-decision data, asymmetrical setting of soft-decision thresholds can be easily performed.

In the above example, the input and output bit-widths of the soft-decision-data generating circuit 12 are 6 and 3 bits, respectively. The embodiment may be configured to be applied to a case having other bit widths.

The optical receiving apparatus according to the embodiment can output, from m-bit input data, soft-decision data with a bit width thereof reduced to n bits (n=p+1) that corresponds to a determination result according to $2^n-1$ soft-decision thresholds. The soft-decision data is obtained by using the MSB of the m-bit input data as hard-decision data and, by using a result of a comparison of a plurality of bits (k bits, where k≤m) on the MSB side with a fixed threshold or p bits (p≤m−k) selected from (m−k) bits on the LSB side as reliability information, in the soft-decision-data generating circuit.

Accordingly, it can reduce load involved in soft-decision data generation.

Also, by setting a range of p-bit selection in the soft-decision-data generating circuit 12 from outside of the optical receiving apparatus, soft-decision data with which the error correction can be optimized is generated.

Furthermore, by varying the bit positions of the p-bits depending on the hard-decision data, soft-decision data to which soft-decision thresholds are set at different intervals on the mark and space sides can be generated.

Therefore, soft-decision thresholds can be set at a regular interval as well as an irregular interval, and optimal soft-decision data can be easily generated for both of symmetrical and asymmetrical noise distributions.

The present invention can reduce load associated with soft-decision data generation because it enables output of soft-decision data with a bit width thereof reduced to n bits on an optical receiving apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical receiving apparatus comprising:
an analog-to-digital (A/D) converting circuit that converts a received analog signal to a received digital signal;
a received-signal demodulating circuit that demodulates the received digital signal into an m-bit received signal;
a soft-decision-data generating circuit that generates n-bit soft-decision data, which corresponds to a determination result according to $2^n-1$ soft-decision thresholds, based on the m-bit received signal, where n≤m; and
an error correcting circuit that performs error correction based on the n-bit soft-decision data and outputs an error-corrected received signal, wherein
the soft-decision-data generating circuit sets a most significant bit (MSB) of the m-bit received signal as hard-decision data, creates reliability information, and generates the n-bit soft-decision data including the most significant bit and the reliability information, and
p sequential bits extracted from m−k bits on a least significant bit (LSB) side of the m-bit received signal are set as the reliability information, where k bits are bits on a MSB side of the m-bit received signal, 2≤k≤m, p≤m−k, and p is a constant.

2. The optical receiving apparatus according to claim 1, wherein a range value that is larger than a largest soft-decision threshold among the $2^n-1$ soft-decision thresholds and a range value that is smaller than a smallest threshold among the $2^n-1$ soft-decision thresholds are outside of outermost soft-decision thresholds among the $2^n-1$ soft-decision thresholds, and
a result of a comparison between the k bits on a MSB side of the m-bit received signal and a fixed threshold is set as the reliability information when the m-bit received signal lies in the outside of the outermost soft-decision thresholds.

3. The optical receiving apparatus according to claim 2, wherein the soft-decision-data generating circuit arranges the soft-decision thresholds at a regular interval in a vicinity of a central value of the m-bit received signal.

4. The optical receiving apparatus according to claim 1, wherein a range of p-bit selection is set to the soft-decision-data generating circuit, from outside of the optical receiving apparatus.

5. The optical receiving apparatus according to claim 1, wherein the soft-decision-data generating circuit varies bit positions of the p-bits depending on a mark side and a space side of the most significant bit.

6. The optical receiving apparatus according to claim 1, wherein the soft-decision-data generating circuit arranges the soft-decision thresholds at a regular interval in a vicinity of a central value of the m-bit received signal.

7. An optical receiving method comprising:
converting a received analog signal to a received digital signal;
demodulating the received digital signal into an m-bit received signal;
generating n-bit soft-decision data based on the m-bit received signal, wherein n≤m; and
performing error correction to the m-bit received signal based on the n-bit soft-decision data, which corresponds to a determination result according to $2^n-1$ soft-decision thresholds, and outputting an error-corrected received signal, wherein
in the generating, a most significant bit (MSB) of the m-bit received signal is set as hard-decision data, reliability information is created, and the n-bit soft decision data including the most significant bit and the reliability information is generated, and
p sequential bits extracted from m−k bits on a least significant bit (LSB) side of the m-bit received signal are set as the reliability information, where k bits are bits on a MSB side of the m-bit received signal, 2≤k≤m, p≤m−k, and p is a constant.

* * * * *